United States Patent [19]

Williames

[11] Patent Number: 4,597,252
[45] Date of Patent: Jul. 1, 1986

[54] PYRETHRUM HARVESTING MACHINES

[75] Inventor: Geoffrey A. Williames, Warragul, Australia

[73] Assignee: Geoff. Williames (Aust.) Pty. Ltd., Victoria, Australia

[21] Appl. No.: 740,230

[22] Filed: Jun. 3, 1985

Related U.S. Application Data

[63] Continuation of Ser. No. 495,765, May 18, 1983, abandoned.

[30] Foreign Application Priority Data

May 19, 1982 [AU] Australia .............................. PF4066
Feb. 7, 1983 [AU] Australia ............................ 11209/83

[51] Int. Cl.⁴ ........................................... A01D 45/00
[52] U.S. Cl. ..................................... 56/130; 56/13.1; 56/364
[58] Field of Search .................. 56/12.9, 13.1, 30, 126, 56/130, 128, 364

[56] References Cited

U.S. PATENT DOCUMENTS

| | | | |
|---|---|---|---|
| 122,892 | 1/1872 | Irwin | 56/204 |
| 1,370,919 | 3/1921 | Schaefer | 56/130 |
| 1,953,639 | 4/1934 | Waggoner | 56/13.1 |
| 2,387,004 | 10/1945 | Berry | 56/30 |
| 2,493,564 | 1/1950 | Arneson | 56/13.1 |
| 2,508,401 | 5/1950 | Kirk | 56/130 |
| 2,696,706 | 12/1954 | Getsinger | 56/364 |
| 2,961,819 | 11/1960 | Edwards, Jr. | 56/30 |
| 2,988,863 | 6/1961 | Edwards, Jr. | 56/30 |
| 3,212,247 | 10/1965 | Erickson | 56/126 |
| 3,651,624 | 3/1972 | Bandemer | 56/13.3 |
| 3,736,736 | 6/1973 | Myers | 56/16.6 |
| 3,797,216 | 3/1974 | Resetich | 56/364 |
| 3,892,061 | 7/1975 | Whitley | 56/126 |
| 3,964,245 | 6/1976 | Hecht | 56/12.9 |
| 4,217,672 | 2/1980 | Olivari | 56/364 |

FOREIGN PATENT DOCUMENTS

| | | | |
|---|---|---|---|
| 21234 | 5/1930 | Australia | 56/12.9 |
| 1580359 | 12/1980 | United Kingdom | 56/12.9 |

Primary Examiner—Paul J. Hirsch
Attorney, Agent, or Firm—Learman & McCulloch

[57] ABSTRACT

Apparatus for harvesting pyrethrum flowers comprises a rotary picking head within which are mounted picking fingers reciprocable between retracted and projected positions. The fingers are spaced apart a distance to enable mature blooms to be severed from their stems. The picking head is partially enclosed by a shroud that communicates via ducting with a bin. An air stream is created within the shroud and ducting to cause picked blooms to be conveyed from the picking head to the bin.

17 Claims, 9 Drawing Figures

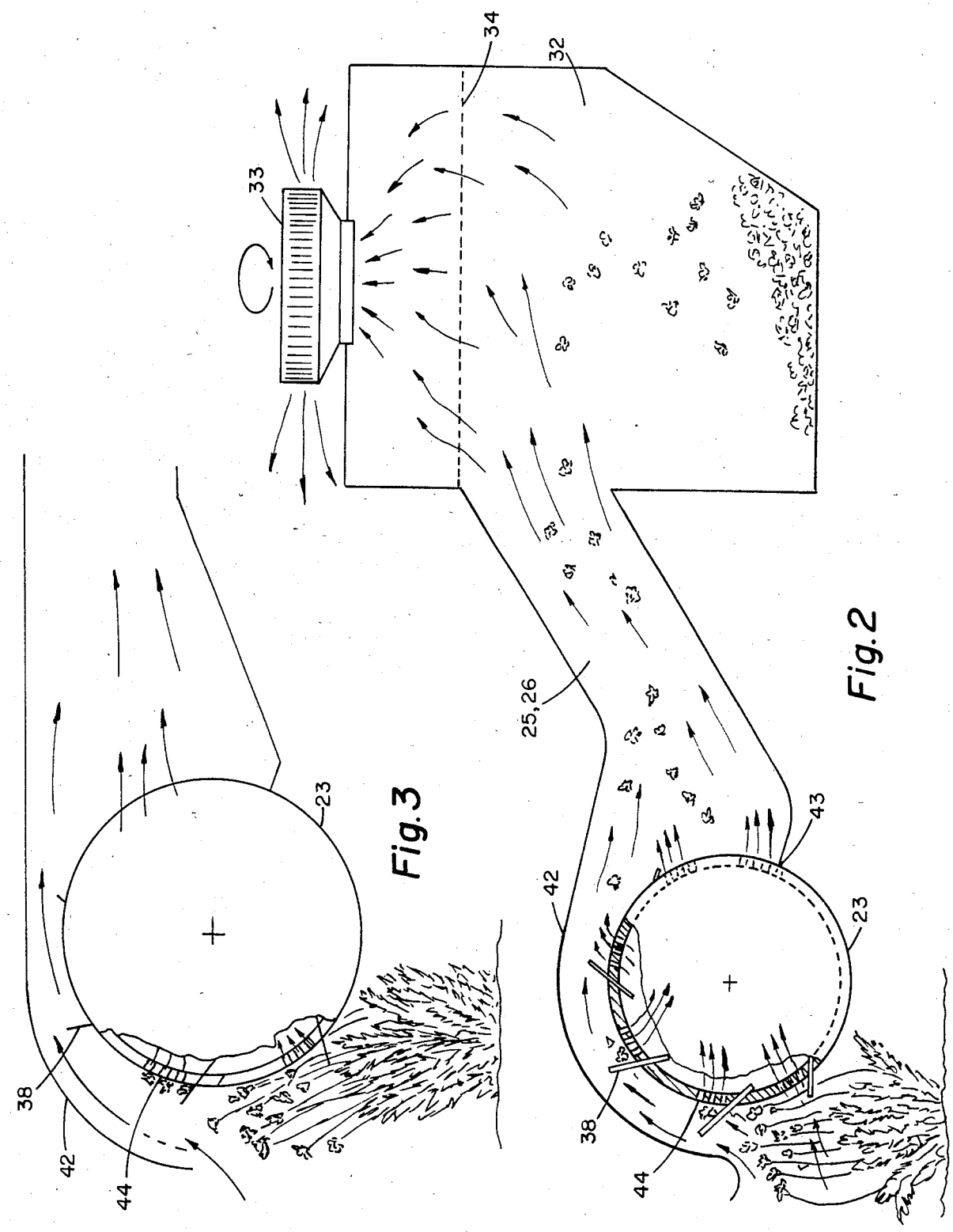

PYRETHRUM HARVESTING MACHINES

This is a continuation of co-pending application Ser. No. 495,765 filed on May 18, 1983 now abandoned.

FIELD OF THE INVENTION

This invention relates to pyrethrum harvesting machines.

Pyrethrum is one of the oldest and best known plant insecticides. It has been used for many years for controlling household insects such as flies and for controlling pests on agricultural crops. The fact that it is harmless to man and animal has made it particularly desirable for household use and on food crops.

The range of usefulness of the insecticide has been achieved by the extracting of pyrethrins from the flowers of the pyrethrum plant. These extracts in suitable form are widely used as household sprays and for the control of insects in greenhouses and garden crops.

The pyrethrum flower must be harvested during a relatively short time because the flowers rapidly reach and pass the preferred stage of picking. Furthermore the plants are not strong being prone to lean or fall to the ground in unfavourable conditions. These factors have made it difficult to mechanically harvest the pyrethrum flower.

OBJECTS OF THE INVENTION

It is an objective of the present invention to provide a harvesting machine which will harvest pyrethrum flowers substantially at maturity with little or no damage to the plant and minimal wastage.

SUMMARY OF THE INVENTION

There is provided according to the present invention a harvesting machine for pyrethrum flowers comprising a header mounted on a mobile chassis for contacting a crop to be harvested the header having a rotatable picking head including picker means mounted for movement relatively to said drum between projected and retracted positions for engaging and picking mature pyrethrum flowers.

In one embodiment of the invention there is provided a harvesting machine for pyrethrum flowers comprising a rotatable header drum with a series of circumferentially disposed combs having radially extending fingers, the spacing of the comb fingers being such that flowers of predetermined maturity are picked. Accordingly selective harvesting of mature flowers is achieved by varying the space between the picking members. It is a characteristic of pyrethrum plant flowers for the base bowl of the flower to grow larger and be firm as the flower matures. According to the invention the spacing between adjacent picking fingers enables mature blooms to be harvested but for smaller immature flowers to pas between the fingers thereby, enabling the buds and smaller blooms to be left on the bush until they mature.

Conveniently the harvester picking head includes a suction vacuum system which can be attached to a high clearance tractor frame to enable the straddling of pyrethrum beds and the conveyance of the picked flowers to a bulk hopper bin suitably designed to discharge into bulk collection bin.

Such a harvesting machine is easily controlled by the operator to harvest selectively picked flowers and provides storage means for the harvested produce.

There is provided according to the present invention a harvesting machine particularly adopted for harvesting pyrethrum flowers comprising a mobile chassis, an adjustable height picking head attachment for accurate positioning relative to the plants, a crop conveying device associated with the picking head attachment for receiving and conveying crop to a storage device, said storage device including a rotatable drum movable between two angular positions one to receive said crop, and the other an emptying position.

The picking head attachment is a rotating drum with retractable fingers (picking combs); these fingers are removable so as to allow different diameter fingers to be attached to selectively pick mature flowers.

The conveyor device is a duct subjected to vacuum such that picked crop material is drawn from the picking head attachment by suction along the duct to said storage device.

The storage device includes a bin pivotally mounted for rotation through approximately 180°. In the loading position the bin forms part of the area subject to vacuum such that crop material drawn along the vacuum duct falls under gravity into the storage drum.

The periphery of the drum has an open segment which in the loading position is at the top and communicates the drum with the source of vacuum. In the unloading position the open segment of the drum is at the bottom so that crop material can fall from the drum. The machine is constructed to straddle the plants to be harvested and the picking head attachment is pivoted at a point remote from the picking head near the rear of the machine.

Conveniently the combs include retractable fingers mounted for reciprocable linear movement relative to the exterior of the drum such that flower heads of predetermined size are picked and carried partly around the periphery of the drum and released as said fingers are retracted; the outer surface of the drum is associated with an enveloping shroud connected to a source of vacuum adapted to collect harvested flower heads as they are released by the retracting fingers. When the flower is picked the stem is drawn taut creating a small amount of compression in the flower head when the stem parts of the head; flowers if unrestrained, tend to spring off the picking means and fall away from the head onto the ground. Conveniently the drum is perforated allowing the vacuum sucking fan to pull air through the drum. This causes loose picked flowers to adhere to the surface of the drum preventing dislodgement and falling to the ground. As the drum rotates and the flowers are transported to the opposite side of the rotating drum and inside the vacuum shroud the reverse action takes place and the flow of air through the perforated drum removes the flowers and accelerates their movement into the air conveyance duct or onto a conveyor belt to the receiving chamber.

DESCRIPTION OF THE DRAWINGS

The invention will now be described in greater detail having reference to the accompanying drawings in which:

FIG. 2 is a diagrammatic view, partly broken away of a portion of the apparatus shown in FIG. 1;

FIG. 3 is a partial diagrammatic view of the picker drum and enveloping shroud;

Figure 1:
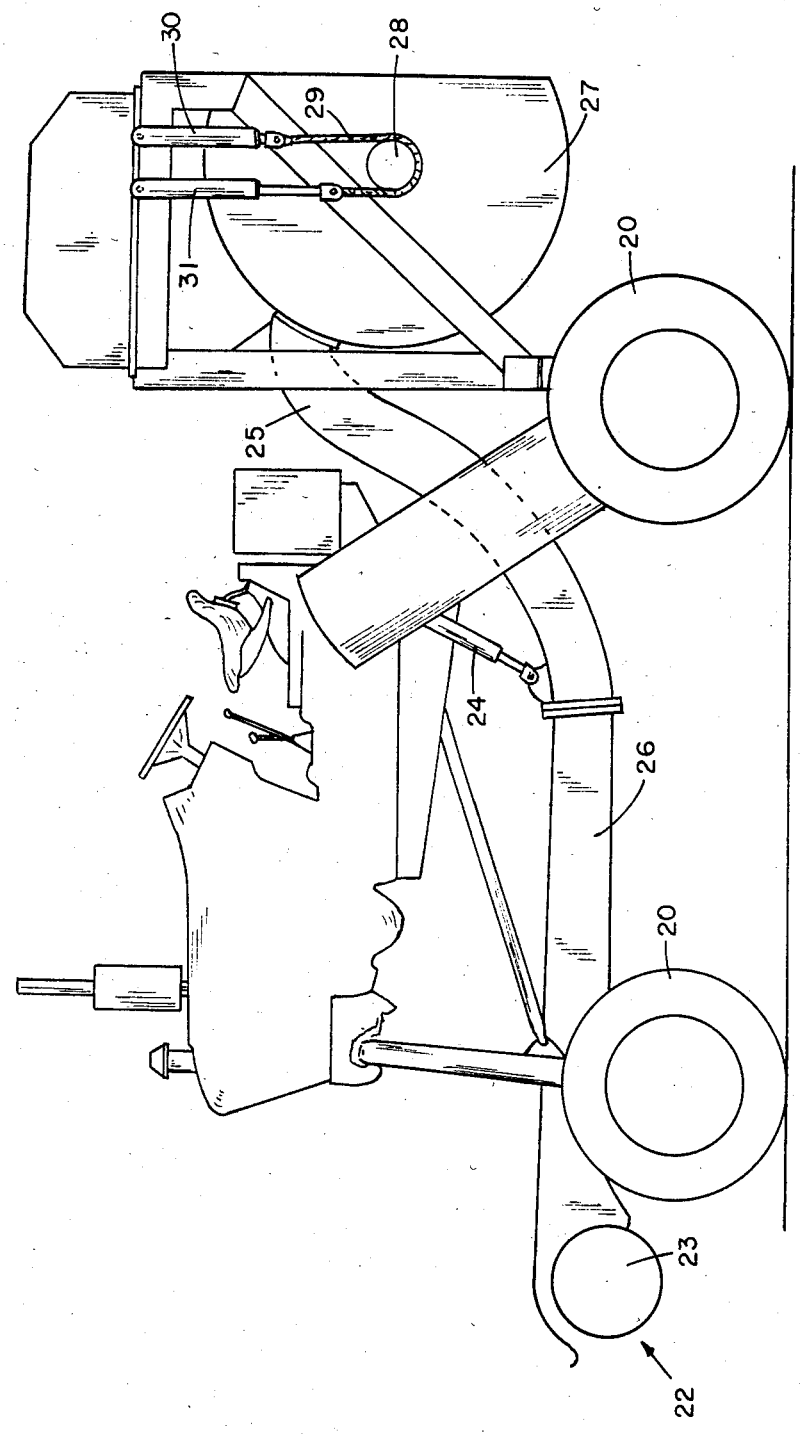
FIG. 1 is a diagrammatic, elevational view of a harvesting machine according to the invention.

According to a preferred embodiment of the invention shown in FIG. 1 a mobile tractor chassis is mounted on wheels 20 and supports a picking head attachment 22. The tractor wheels are adapted to straddle plants to be harvested. This form of harvesting is particularly suitable for pyrethrum flower picking. The picking head attachment 22 includes a rotating drum 23 having picking fingers that are movable between retracted and projected positions and which may be removably mounted on the drum so that larger or smaller fingers can be substituted for selectively picking different size mature flowers. The drum is rotated hydraulically in a conventional manner.

The picking head attachment 22 is mounted for vertical movement under the control of a power cylinder 24. The attachment 22 is coupled to ducting 25 and 26 leading to a storage bin 27 mounted for rotary movement on a spindle 28 having a sprocket engaged by a chain 29 connected at its opposite ends to power cylinders 30, 31 adapted to operate in opposite directions in unison. In the position shown in FIG. 1 the bin 27 is in an upright position to receive picked blooms, but it may be rotated through about 180° to a position in which its contents may be unloaded. As is diagrammatically shown in FIG. 2, the ducts 25, 26 communicate with the interior compartment 32 of the bin and at the upper end of the bin is a fan casing 33 within which is mounted turbine or fan blades which induce suction in the ducts 25, 26. A screen 34 extends across the upper part of the compartment 32 just below the fan.

According to the invention the attachment 22 includes a hollow picking drum 23 within which is a reciprocating support mechanism 35 for a series of circumferentially spaced combs 36 mounted on a comb support bar 37. The combs 36 include a series of straight, spaced apart fingers 38 which are reciprocable relative to the drum surface along straight or linear paths between retracted and projected positions as is best shown in FIG. 4.

Figure 4:
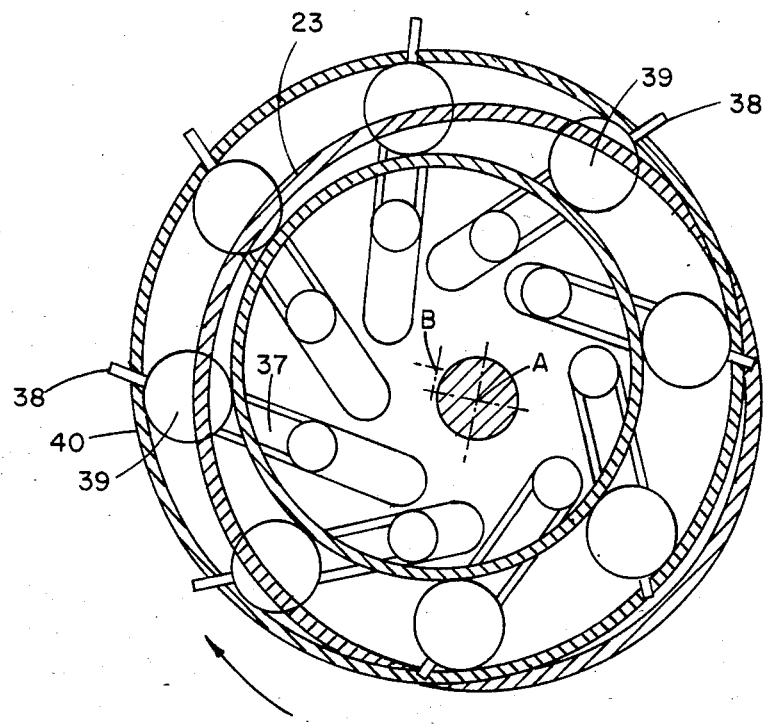
FIG. 4 is a diagrammatic, sectional view through the picker drum.

In operation the drum 23 rotates about the horizontal axis A in the direction of the arrow in FIG. 4. The fingers 38 of each set are fully projected from the drum surface at the point of contact of the drum with a plant whose flower is to be harvested. The spacing of the comb fingers ensures that only flowers of mature size are harvested.

Figure 5:
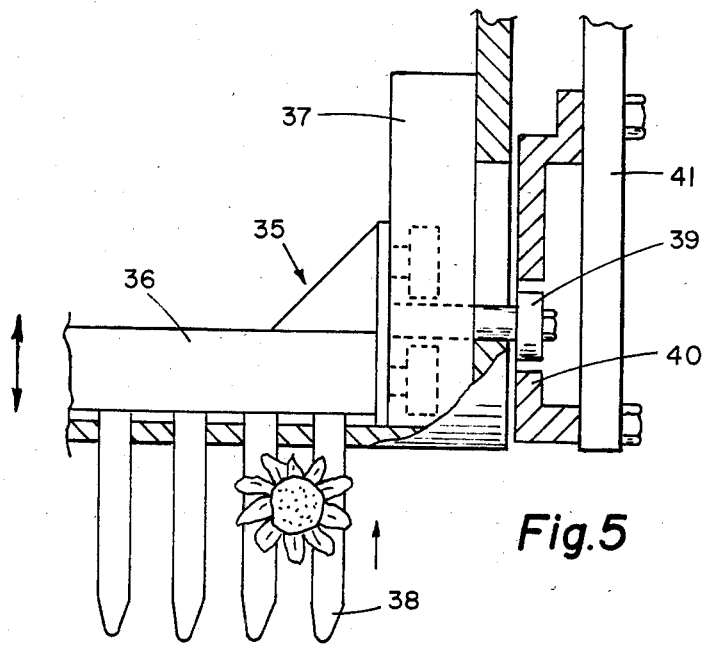
FIG. 5 is a fragmentary top plan view, with parts broken away, of the picker drum.

FIGS. 4 and 5 show in greater detail the construction and operation of the finger projecting and retracting mechanism. The comb bar 37 is mounted on a cam follower 39 which follows a cam track 40 fixedly mounted on the harvester frame 41. The cam track 40 forms a circular path having its axis B eccentric to the axis of rotation of the drum whereby the fingers 38 project from the drum surface at its leading edge to sever the flowers from their stems and retract at the trailing edge to release picked flowers.

The fingers 38 extend through openings in the drum wall and both the comb assembly and the drum are kept in alignment by a 1:1 ratio drive to both of them from a common drive shaft.

With reference to FIG. 4 the timing of the movement of the comb fingers is such that they are made to commence their projecting movement relative to the drum face and to engage the brushed over pyrethrum stems at the 7-8 o'clock position as viewed from the drum end.

Referring to FIGS. 2 and 4, for example, the drum is accommodated in an opening of and is partially enclosed by a shroud or vacuum chute 42 which forms an extension of the duct 25. The shroud has end, upper, and lower walls, the latter terminating in a lower lip 43 (FIG. 2) which lies closely adjacent the trailing surface of the drum 23. The upper wall of the shroud has a curvilinear extension that projects forwardly of the drum. The presence of the shroud enables the fan 33 to generate a high velocity air draft in the vicinity of the leading side of the drum 23 for a purpose to be explained.

The picking drum 23 may be placed ahead of the harvester so that a wide path can be harvested ahead of any wheel damage inflicted on the stems and flowers to avoid the necessity of growing pyrethrum in beds (which is the traditional method) and allows broad acre field planting with increased density per acre.

In operation, the picking head attachment is adjusted vertically to a position in which the drum 23 is at a level to engage the flower stems between the blooms at their upper ends and ground level, as is shown in FIGS. 2 and 3. As the mobile chassis moves forwardly, i.e., to the left as viewed in FIG. 1, the drum 23 is rotated continuously and a stream of air flows through the shroud and the ducting into and through the collecting bin compartment 32.

As the drum 23 rotates, the picking fingers are caused to reciprocate along a linear path between retracted and projected positions relative to the drum surface. As is best shown in FIG. 4, each set of fingers occupies a retracted position until it is rotated past bottom dead center and then reaches a fully projected position between about the 7 and 8 o'clock position. The spacing between the drum and the shroud is sufficient to accommodate the projected fingers. The fingers of each set remain projected until they pass the top dead center position, but then are withdrawn to the fully retracted position prior to the time they reach the lip 43 of the shroud, which, as shown, is closely adjacent the drum surface.

Figure 6:
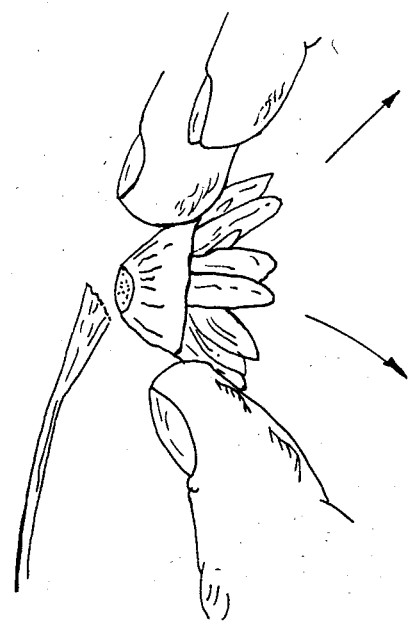
FIG. 6 is a view illustrating manual picking of a bloom.
Figure 7:
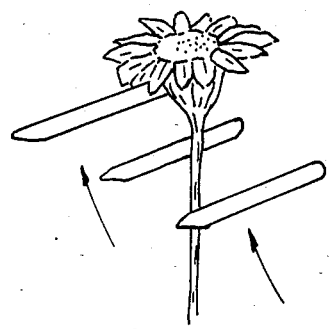
FIGS. 7 and 8 are diagrammatic views illustrating unacceptable machine picking of a bloom.
Figure 8:
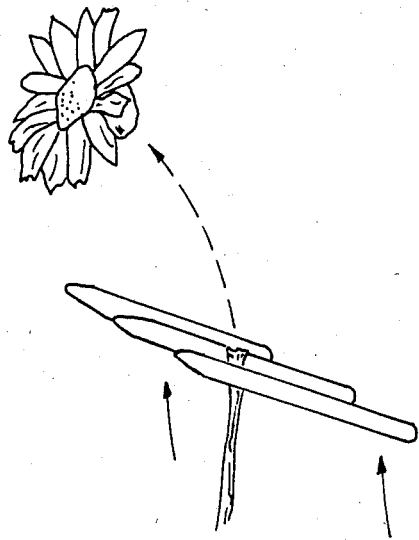

As is shown in FIGS. 2 and 4 the fingers 38 of each set are straight and are reciprocated along a straight or linear path such that, in the projected position, they form a substantially constant acute angle with the drum surface in the direction of drum rotation. The significance of this is illustrated in FIGS. 6, 7, and 8. FIG. 6 illustrates the preferred manual method of separating a mature bloom from its stem. The bloom is rocked clockwise while simultaneously an upwardly inclined force is applied on the bloom. As a result, the bloom is separated cleanly from its stem.

Figure 9:
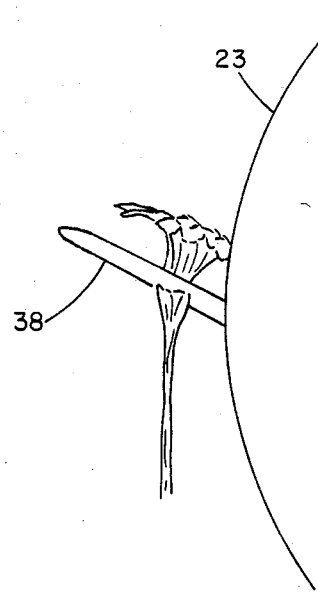
FIG. 9 is a view similar to FIG. 8 but illustrating the picking of a bloom with a picker drum according to the invention.

It is undesirable to attempt to sever a bloom from its stem by applying a vertical force on the bloom, either manually or by picking fingers as is shown in FIG. 7, for example. This is because the application of vertical force only on the bloom is likely to cause the stem to separate at a weak point remote from the bloom, or such force may result in uprooting of the plant, thereby resulting in the harvesting of unwanted stems. By projecting the picking fingers at an acute angle to the surface of the picking drum, the bloom is caught between the fingers and the drum surface and is caused to rock clockwise relative to the stem, as is shown in FIG. 9. This rocking, coupled with the continued clockwise rotation of the drum, simulates quite faithfully the preferred, manual method of picking the flowers.

When a bloom separates from its stem, there often is a tendency for the bloom to bound away from the picking fingers, as is illustrated in FIG. 8. This tendency is overcome partially by the angular extension of the fingers to form with the drum surface an acute angle, as described above. In addition, the stream of air entering the shroud 42 tends to cause the stems to follow the curvature of the drum surface so that, when the blooms are separated from their stems, they will be in a position to be entrained in the air stream.

A further effective manner of avoiding loss of picked blooms is the provision of openings in the drum through which air may pass into and then out of the drum. This feature is shown in FIGS. 2 and 3 wherein openings 44 are formed in the drum surface on the leading side of each set of picking fingers. The openings 44 enable portions of the air stream generated by the fan 33 to enter the drum at the forward side thereof, as shown by the arrows, to assist in holding plucked blooms against the drum surface. By the time the drum rotates to a position in which a set of openings 44 is beyond top dead center, air in the drum passes outwardly through the openings, thereby assisting in discharging the blooms to the ducting leading to the collection bin.

FIG. 2 also illustrates the discharge of picked blooms to the bin compartment 32. As the stream of air issuing from the duct 26 enters the bin compartment, the much greater volume thereof effects expansion of the air in the stream and deceleration thereof. Consequently, the entrained blooms fall by gravity toward the bottom of the compartment whereas air passes through the screen 34 to and through the fan 33.

The claims defining the invention are as follows:

1. A machine adapted for use in harvesting growing flowers each of which has a bloom supported above ground level by an upstanding stem, said machine comprising a mobile chassis; a picking head drum having a plurality of circumferentially spaced openings in its surface; means mounting said drum on said chassis for rotation in one direction about a substantially horizontal axis and at a level to engage the stems of said flowers between the blooms and ground level; a plurality of sets of spaced apart, straight comb-like picking fingers; support means for each of said sets of fingers located within said drum for rotation therewith, said support means supporting the associated set of fingers for reciprocating movements along a linear path through adjacent openings in said drum; cam means carried by said chassis; and cam follower means carried by each of said support means for engagement with said cam means in response to rotation of said drum, said cam means and said cam follower means cooperating with one another during rotation of said drum to cause the fingers of each of said sets to reciprocate through the adjacent openings along said linear path between projected and retracted positions, said cam means and said cam follower means effecting movement of each set of fingers as it moves upwardly from bottom dead center from a retracted position within said drum to a substantially fully projected position, the fingers of each of said sets when in the projected position forming with the adjacent drum surface a substantially constant acute angle in said direction of rotation.

2. A machine according to claim 1 wherein said drum has other openings therein through which air continuously may pass; and suction means in communication with the interior of said drum.

3. A machine according to claim 2 wherein said other openings are arranged adjacent to each of said sets of fingers and on that side thereof which corresponds to the direction of rotation of said drum.

4. A machine according to claim 1 wherein the spacing between adjacent fingers of each of said sets thereof is such as to enable the blooms of immature flowers to pass therebetween and to exert a force on the blooms of mature flowers sufficient to separate them from their stems.

5. A machine according to claim 1 wherein the fingers of each set when in their projected position extend beyond said drum at such an acute angle to its surface that a stem extending downwardly from a bloom supported by two adjacent fingers and bearing against said surface of said drum may be bent and broken adjacent said bloom.

6. A machine according to claim 1 wherein said cam means and said cam follower means initiate movement of each of said sets of fingers from a fully retracted position only after each such set has been rotated past bottom dead center.

7. A machine according to claim 6 wherein said cam means and said cam follower means effect movement of each of said sets of fingers to its fully projected position by the time each such set has been rotated to between about its 7 and 8 o'clock position.

8. A machine according to claim 1 wherein said cam means and said cam follower means effect movement of each of said sets of fingers from its projected position to its fully retracted position following its being rotated to top dead center and prior to its being rotated to bottom dead center.

9. A machine according to claim 1 wherein said cam means defines a circular path having its center eccentric to the axis of rotation of said drum.

10. A machine according to claim 1 wherein said drum is accommodated within an opening at one end of a shroud having upper, bottom, and side walls, said upper wall overlying said drum and terminating in a curvilinear section which extends beyond said drum in the direction of movement of said chassis, said upper wall and said section thereof being spaced from the surface of said drum a distance sufficient to provide clearance for projected sets of said fingers.

11. A machine according to claim 10 wherein the bottom wall of said shroud is spaced from the surface of said drum a distance insufficient to provide clearance for projected sets of fingers.

12. A machine according to claim 10 including fan means in communication with said shroud for generating an air stream through said shroud towards its other end to convey picked blooms in a direction away from said drum.

13. A machine adapted for use in harvesting growing flowers each of which has a bloom supported above ground level by an upstanding stem, said machine comprising a mobile chassis; a hollow picking head drum having a plurality of circumferentially spaced openings in its surface; means mounting said drum on said chassis for rotation in one direction about a substantially horizontal axis and at a level to enable its leading side to engage the stems of said flowers between the blooms and ground level; a plurality of sets of spaced apart, straight, comb-like picking fingers; support means for each of said sets of fingers located within said drum for rotation therewith, said support means supporting the associated set of fingers for reciprocating movements along a linear path through adjacent openings in said drum; cam means carried by said chassis; cam follower means carried by each of said support means for engagement with said cam means in response to rotation of said drum, said cam means and said cam follower means cooperating with one another during rotation of said drum to cause the fingers of each of said sets to reciprocate through the adjacent openings along said linear path between projected and retracted positions, said drum having additional openings therein adjacent the fingers of each of said sets in the direction of rotation of said drum; shroud means embracing said drum except for the leading side thereof; suction generating means; and ducting coupling said shroud means and said suction generating means whereby to establish an air stream flowing through said additional openings at the leading side of said drum, through said drum, and through said other openings opposite those at the leading side of said drum, and thence through said ducting.

14. A machine according to claim 13 wherein the path along which each set of said fingers is reciprocated causes the fingers of each set when in the projected position to form a substantially constant acute angle with the surface of said drum in the direction of rotation of the latter.

15. A machine according to claim 13 wherein said cam means and said cam follower means initiate movement of each of said sets of fingers from a fully retracted position only after each such set has been rotated past bottom dead center.

16. A machine according to claim 15 wherein said cam means and said cam follower means effect movement of each of said sets of fingers to its fully projected position by the time each such set has been rotated to between about its 7 and 8 o'clock position.

17. A machine according to claim 13 wherein said cam means and said cam follower means effect movement of each of said sets of fingers from its projected position to its fully retracted position following its being rotated to top dead center and prior to its being rotated to bottom dead center.

* * * * *